(12) United States Patent
Carns et al.

(10) Patent No.: US 8,701,467 B2
(45) Date of Patent: *Apr. 22, 2014

(54) FLANGE FITTING WITH LEAK SENSOR PORT

(75) Inventors: James A. Carns, Wichita, KS (US);
Theron L. Cutler, Wichita, KS (US);
Mark A. Shelly, Bel Aire, KS (US)

(73) Assignee: The Boeing Company, Chicago, IL (US)

( * ) Notice: Subject to any disclaimer, the term of this patent is extended or adjusted under 35 U.S.C. 154(b) by 545 days.

This patent is subject to a terminal disclaimer.

(21) Appl. No.: 13/041,998

(22) Filed: Mar. 7, 2011

(65) Prior Publication Data

US 2011/0154886 A1 Jun. 30, 2011

Related U.S. Application Data

(62) Division of application No. 11/943,460, filed on Nov. 20, 2007, now Pat. No. 7,942,452.

(51) Int. Cl.
*F16L 55/00* (2006.01)
(52) U.S. Cl.
USPC ............... 73/46; 73/40.5 R; 73/49.1; 73/49.5; 285/93; 285/123.1; 285/123.12; 285/123.15; 285/123.16
(58) Field of Classification Search
USPC .................................. 73/40.5 R, 46
See application file for complete search history.

(56) References Cited

U.S. PATENT DOCUMENTS

| 2,790,870 | A | | 6/1883 | Emery |
| 1,466,592 | A | | 8/1923 | King |
| 1,497,652 | A | * | 6/1924 | Browne ........................ 285/13 |
| 2,491,599 | A | | 12/1949 | Allen |
| 3,427,051 | A | | 2/1969 | White et al. |
| 3,472,062 | A | | 10/1969 | Owen |
| 3,485,516 | A | * | 12/1969 | Kell et al. ........................ 285/14 |

(Continued)

FOREIGN PATENT DOCUMENTS

| DE | 9111431 U1 | 5/1992 |
| EP | 2045503 A2 | 4/2009 |

(Continued)

OTHER PUBLICATIONS

"Universal Bellows", DME Incorporated, May 5, 2004. http://web.archive.org/web/20040505084913/http://www.dmeexpansionjoints.com/universal-bellows.htm.

(Continued)

*Primary Examiner* — Hezron E Williams
*Assistant Examiner* — Alexander Mercado
(74) *Attorney, Agent, or Firm* — Yee & Associates, P.C.

(57) ABSTRACT

A leak detection feature for a fluid conduit. The leak detection feature facilitates the monitoring of fluid leaks at the interface of two adjoining conduit flange fittings. An embodiment of a flange fitting with a leak detection feature for a fluid conduit having an opening. The flange fitting includes a flange body around the opening of the fluid conduit, a leak detection passageway formed in the flange body, and a leak detection port formed in the flange body. The flange body has a sealing face surface configured to mate with a cooperating flange fitting, and the leak detection passageway terminates at the sealing face surface. The leak detection port is in fluid communication with the leak detection passageway, and the leak detection port is configured for fluid communication with a leak sensing apparatus.

9 Claims, 16 Drawing Sheets

(56) References Cited

U.S. PATENT DOCUMENTS

| | | | |
|---|---|---|---|
| 3,669,474 A | 6/1972 | Bode | |
| 3,830,290 A | 8/1974 | Thamasett et al. | |
| 3,837,685 A | 9/1974 | Miller | |
| 3,842,187 A | 10/1974 | Barkan | |
| 3,954,288 A * | 5/1976 | Smith | 285/93 |
| 4,157,194 A | 6/1979 | Takahashi | |
| 4,274,007 A * | 6/1981 | Baatz et al. | 250/506.1 |
| 4,285,239 A | 8/1981 | Heine et al. | |
| 4,420,970 A * | 12/1983 | Organi | 73/46 |
| 4,429,905 A | 2/1984 | Valentine | |
| 4,455,040 A | 6/1984 | Shinn | |
| 4,461,399 A | 7/1984 | Sattelberg et al. | |
| 4,569,540 A | 2/1986 | Beson | |
| 4,881,760 A | 11/1989 | Runkles et al. | |
| 4,900,070 A | 2/1990 | Runkles et al. | |
| 5,015,515 A | 5/1991 | Paulin | |
| 5,054,523 A | 10/1991 | Rink | |
| 5,090,871 A | 2/1992 | Story et al. | |
| 5,188,400 A | 2/1993 | Riley et al. | |
| 5,312,137 A | 5/1994 | Nee | |
| 5,330,720 A * | 7/1994 | Sorbo et al. | 422/98 |
| 5,419,593 A | 5/1995 | Greene et al. | |
| 5,427,474 A | 6/1995 | Silvers | |
| 5,533,760 A | 7/1996 | Welch | |
| 5,620,210 A | 4/1997 | Eyster et al. | |
| 5,749,607 A | 5/1998 | Carr | |
| 6,000,278 A * | 12/1999 | Hystad | 73/46 |
| 6,041,645 A | 3/2000 | Lawson et al. | |
| 6,299,216 B1 | 10/2001 | Thompson | |
| 6,446,661 B2 | 9/2002 | Armenia et al. | |
| 6,848,720 B2 | 2/2005 | Carns et al. | |
| 6,971,682 B2 * | 12/2005 | Hoang et al. | 285/93 |
| 7,213,787 B2 | 5/2007 | Carns et al. | |
| 7,226,089 B2 * | 6/2007 | Wilkinson, III | 285/123.15 |
| 7,293,741 B2 | 11/2007 | Carns et al. | |
| 7,437,952 B2 | 10/2008 | Carns et al. | |
| 7,458,543 B2 | 12/2008 | Cutler et al. | |
| 7,493,911 B2 | 2/2009 | Carns et al. | |
| 7,533,850 B2 | 5/2009 | Carns et al. | |
| 7,581,700 B2 | 9/2009 | Carns et al. | |
| 7,814,778 B2 * | 10/2010 | McConnell et al. | 73/49.8 |
| 7,900,333 B2 | 3/2011 | Tweet et al. | |
| 7,922,122 B2 | 4/2011 | Carns et al. | |
| 7,942,452 B2 * | 5/2011 | Carns et al. | 285/93 |
| 8,261,596 B2 * | 9/2012 | Harrison | 73/46 |
| 2004/0026922 A1 | 2/2004 | Carns et al. | |
| 2004/0207197 A1 | 10/2004 | Hoang et al. | |
| 2005/0120534 A1 * | 6/2005 | Carns et al. | 29/428 |
| 2006/0278017 A1 | 12/2006 | Carns et al. | |
| 2006/0278759 A1 | 12/2006 | Carns et al. | |
| 2006/0278760 A1 | 12/2006 | Carns et al. | |
| 2006/0278761 A1 | 12/2006 | Cutler et al. | |
| 2006/0278763 A1 | 12/2006 | Carns et al. | |
| 2007/0051406 A1 | 3/2007 | Carns et al. | |
| 2007/0102583 A1 | 5/2007 | Cutler et al. | |
| 2008/0255411 A1 | 10/2008 | Carns et al. | |
| 2008/0264951 A1 | 10/2008 | Tweet et al. | |
| 2009/0091126 A1 | 4/2009 | Carns et al. | |
| 2009/0102187 A1 * | 4/2009 | Carns et al. | 285/123.15 |
| 2009/0127848 A1 | 5/2009 | Carns et al. | |
| 2009/0261583 A1 | 10/2009 | Carns et al. | |
| 2010/0024189 A1 | 2/2010 | Carns et al. | |
| 2011/0185793 A1 * | 8/2011 | Harrison | 73/46 |

FOREIGN PATENT DOCUMENTS

| | | |
|---|---|---|
| EP | 2058573 B1 | 12/2010 |
| EP | 2053294 B1 | 2/2012 |
| WO | 9403752 A | 2/1994 |
| WO | 2007057629 A | 5/2007 |

OTHER PUBLICATIONS

"Expansion Joint Accessories", DME Incorporated, Apr. 29, 2004. http://web.archive.org/web/20040429102447/http://www.dmeexpansionjoints.com/expansion-accessories.htm.

DME Incorporated, Terms and Definitions, 2004, retrieved Feb. 13, 2011, pp. 1-2. www.dmeexpansionjoints.com/terms-definitions.htm.

* cited by examiner

FLANGE FITTING WITH LEAK SENSOR PORT

This application is a divisional of application Ser. No. 11/943,460, filed Nov. 20, 2007, status allowed.

CROSS-REFERENCE TO RELATED APPLICATIONS

The subject matter described herein is related to the subject matter disclosed in the following applications, the relevant content of which is incorporated by reference herein: United States Patent Application Publication number 2005/0120534 A1, titled Shrouded Fluid-Conducting Apparatus; United States Patent Application Publication number 2006/0278017 A1, titled Shrouded Body Flow Meter Assembly; United States Patent Application Publication number 2006/0278760 A1, titled Fittings with Redundant Seals for Aircraft Fuel Lines, Fuel Tanks, and Other Systems; United States Patent Application Publication number 2006/0278761 A1, titled Aerial Refueling System; United States Patent Application Publication number 2006/0278763 A1, titled Adjustable Fittings for Attaching Support Members to Fluid Conduits, Including Aircraft Fuel Conduits, and Associated Systems and Methods; United States Patent Application Publication number 2007/0051406 A1, titled Shrouded Valve Apparatus and Related Methods; United States Patent Application Publication number 2009/0091126 A1, titled Shrouded Coupling Assemblies for Conduits; and United States Patent Application Publication number 2009/0102187 A1, titled Boot Shrouds for Joints in Conduits.

BACKGROUND INFORMATION

1. Field

Embodiments of the subject matter described herein relate generally to fluid conducting apparatus and systems. More particularly, embodiments of the subject matter relate to leak detection features and technologies suitable for use with fluid conducting apparatus and systems.

2. Background

It is sometimes necessary to couple together fluid (gas and/or liquid) conduits. For example, aircraft employ fuel conduits to transfer fuel from a source to a receiving vessel. The Federal Aviation Administration (FAA) has promulgated regulations regarding the safe transfer of fuel via conduits in the aerospace industry. In order to meet some of these regulations, fuel transfer conduits may be structured as a "tube within a tube," often referred to as a "shrouded conduit," which effectively provides a double-walled conduit for containment of the fuel. In use, the fuel flows in the inner tube, or primary fuel conduit, and the annular space between the inner and outer conduits provides a leak detection zone. This annular space may also be used to carry other fluid concurrently with the fuel.

Leak detection at a junction or flange between two conduits is often important, especially when the fluid in the conduits is combustible, highly valuable, or a toxic or hazardous substance. Accordingly, technologies for leak prevention and detection of leaks at a junction between two conduits are important in certain industries and in certain fluid transfer operations.

SUMMARY

A flange fitting for a fluid conduit as provided herein includes a leak detection feature that can be used to monitor for leakage at the flange fitting interface. The leak detection architecture employs a (nominally) sealed leak detection passageway that resides between the two opposing flange faces. The leak detection passageway receives and transports leaked fluid to an external leak sensing apparatus. In this manner, the interface between sections of the conduit can be easily monitored for the presence of leaks.

The above and other aspects may be carried out by an embodiment of a flange fitting having a leak detection feature for a fluid conduit having an opening. The flange fitting includes a flange body around the opening of the fluid conduit, the flange body having a sealing face surface configured to mate with a cooperating flange fitting, a leak detection passageway formed in the flange body, the leak detection passageway terminating at the sealing face surface, and a leak detection port formed in the flange body, the leak detection port in fluid communication with the leak detection passageway, and the leak detection port being configured for fluid communication with a leak sensing apparatus.

The above and other features may be found in an embodiment of a flange fitting with a leak detection feature for an inner fluid conduit and an outer fluid conduit surrounding the inner fluid conduit. The flange fitting includes: a flange body having an inner portion around an opening of the inner fluid conduit, and having an outer portion around an opening of the outer fluid conduit, the flange body having a sealing face surface configured to mate with a cooperating flange fitting; an inner leak detection passageway formed in the inner portion of the flange body, the inner leak detection passageway terminating at the sealing face surface; and an inner leak detection port formed in the inner portion of the flange body, the inner leak detection port in fluid communication with the inner leak detection passageway, and the inner leak detection port being configured for fluid communication with a leak sensing apparatus.

The above and other features may be implemented in an embodiment of a flange fitting assembly with a leak detection feature. The flange fitting assembly includes a first flange fitting for a fluid conduit and a second flange fitting for the fluid conduit, where the flange fittings are configured to mate with one another. The first flange fitting includes a first flange body around the opening of the fluid conduit, the first flange body having a first sealing face surface, a first leak detection passageway formed in the first flange body, the first leak detection passageway terminating at the first sealing face surface, and a first leak detection port formed in the first flange body, the first leak detection port in fluid communication with the first leak detection passageway. The first leak detection port is configured for fluid communication with a leak sensing apparatus. The second flange fitting includes a second flange body around the opening of the fluid conduit, the second flange body having a second sealing face surface configured to mate with the first sealing face surface, a second leak detection passageway formed in the second flange body, the second leak detection passageway terminating at the second sealing face surface, and a second leak detection port formed in the second flange body, the second leak detection port in fluid communication with the second leak detection passageway, and the second leak detection port being configured for fluid communication with the leak sensing apparatus. The first leak detection passageway and the second leak detection passageway combine to form a leak detection duct when the first flange fitting and the second flange fitting are coupled together.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
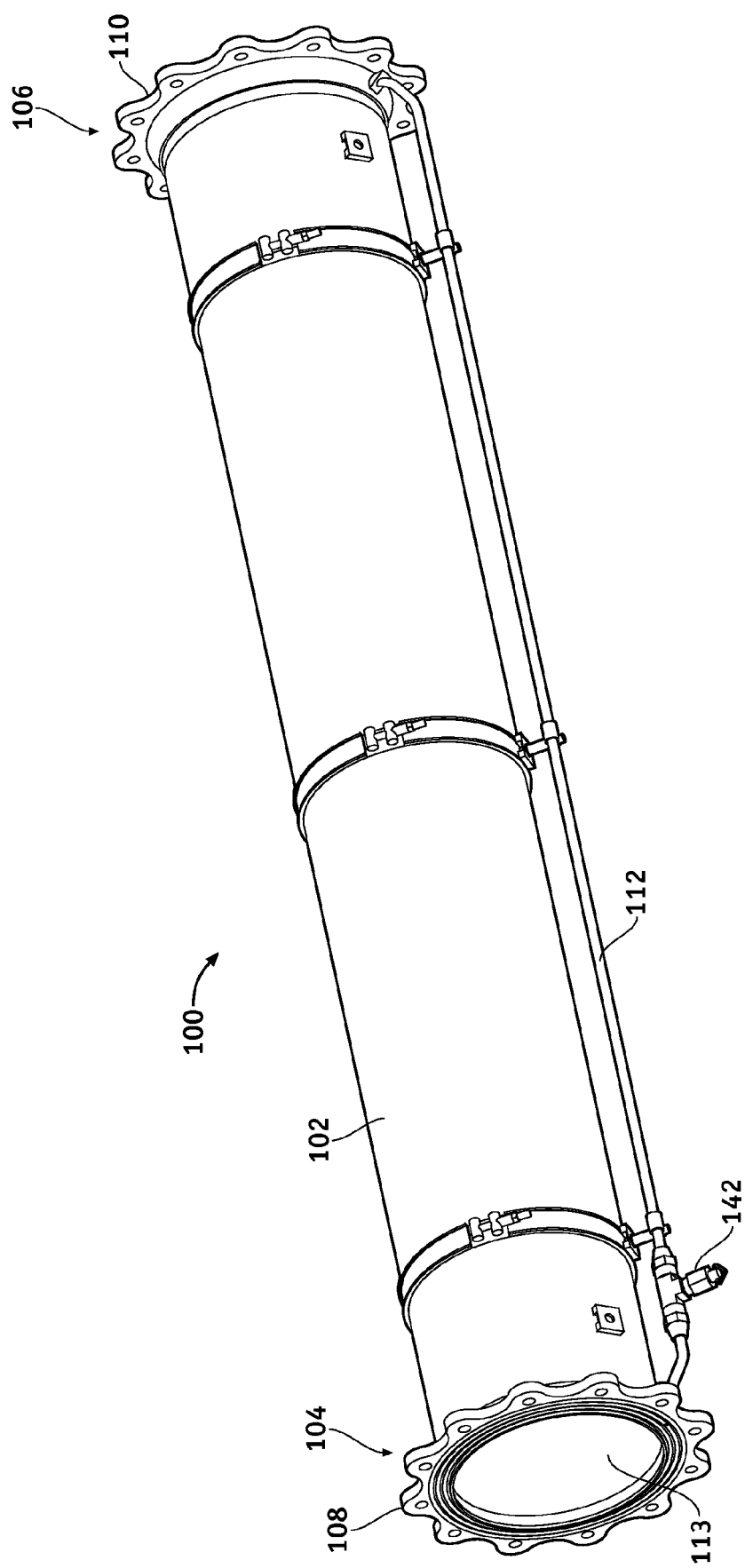
FIG. 1 is a perspective view of an embodiment of a single walled conduit section.

The following detailed description is merely illustrative in nature and is not intended to limit the described embodiments or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus are not intended to be limiting. For example, terms such as "upper," "lower," "above," and "below" refer to directions in the drawings to which reference is made. Terms such as "front," "back," "rear," "side," "outboard," and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context.

The subject matter described herein is related to the subject matter disclosed in the following documents, the relevant content of which is incorporated by reference herein: U.S. Pat. No. 6,848,720, titled Shrouded Fluid-Conducting Apparatus; U.S. Pat. No. 7,213,787, titled Valves for Annular Conduits Including Aircraft Fuel Conduits and Associated Systems and Methods; U.S. Pat. No. 7,293,741, titled System and Methods for Distributing Loads from Fluid Conduits, Including Aircraft Fuel Conduits; United States Patent Application Publication number 2005/0120534 A1, titled Shrouded Fluid-Conducting Apparatus; United States Patent Application Publication number 2006/0278017 A1, titled Shrouded Body Flow Meter Assembly; United States Patent Application Publication number 2006/0278760 A1, titled Fittings with Redundant Seals for Aircraft Fuel Lines, Fuel Tanks, and Other Systems; United States Patent Application Publication number 2006/0278761 A1, titled Aerial Refueling System; United States Patent Application Publication number 2006/0278763 A1, titled Adjustable Fittings for Attaching Support Members to Fluid Conduits, Including Aircraft Fuel Conduits, and Associated Systems and Methods; United States Patent Application Publication number 2007/0051406 A1, titled Shrouded Valve Apparatus and Related Methods; United States Patent Application Publication number 2009/0091126 A1, titled Shrouded Coupling Assemblies for Conduits; and United States Patent Application Publication number 2009/0102187 A1, titled Boot Shrouds for Joints in Conduits.

Figure 2:
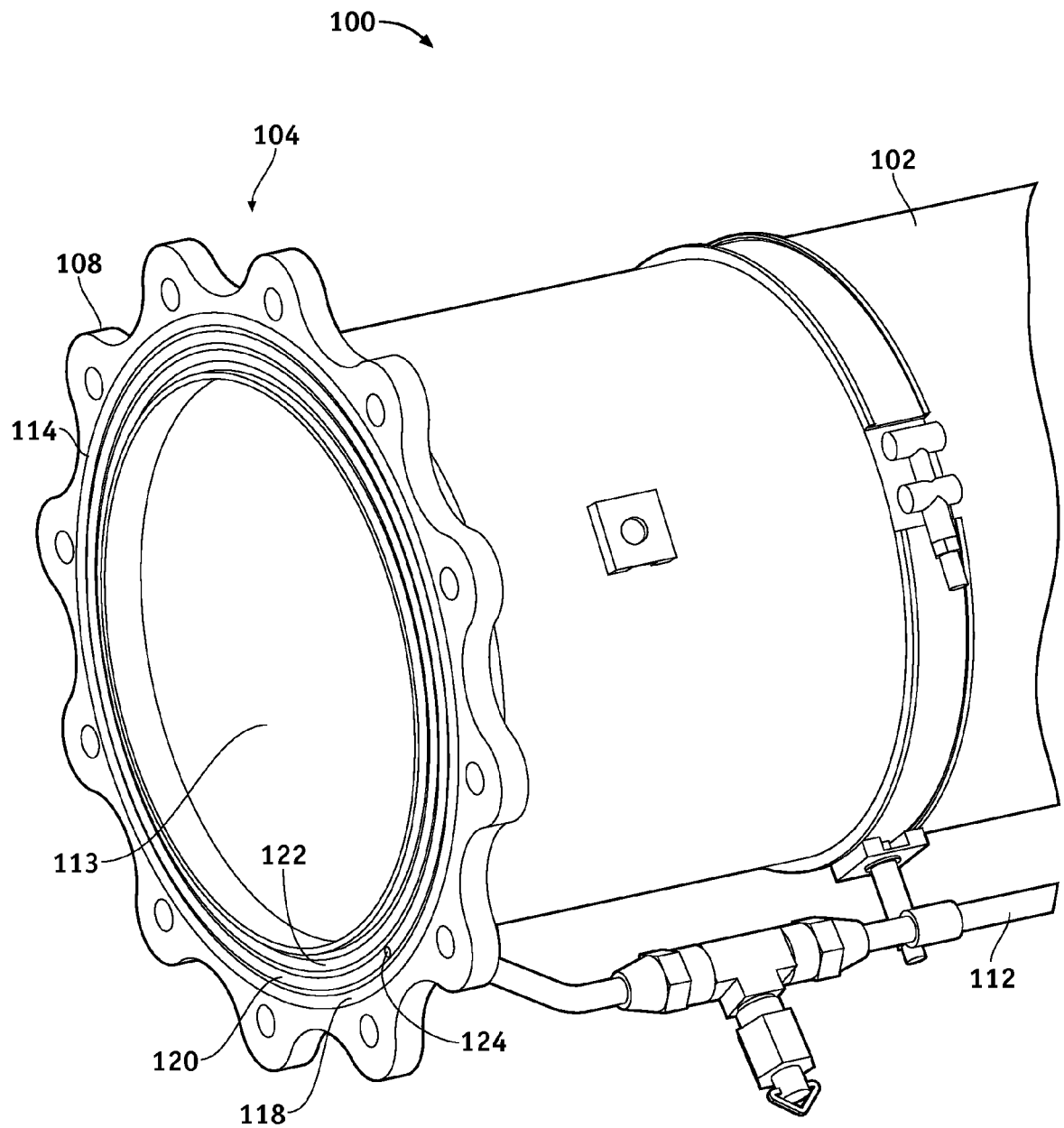
FIG. 2 is a perspective view of a detailed portion of the conduit section shown in FIG. 1.
Figure 3:
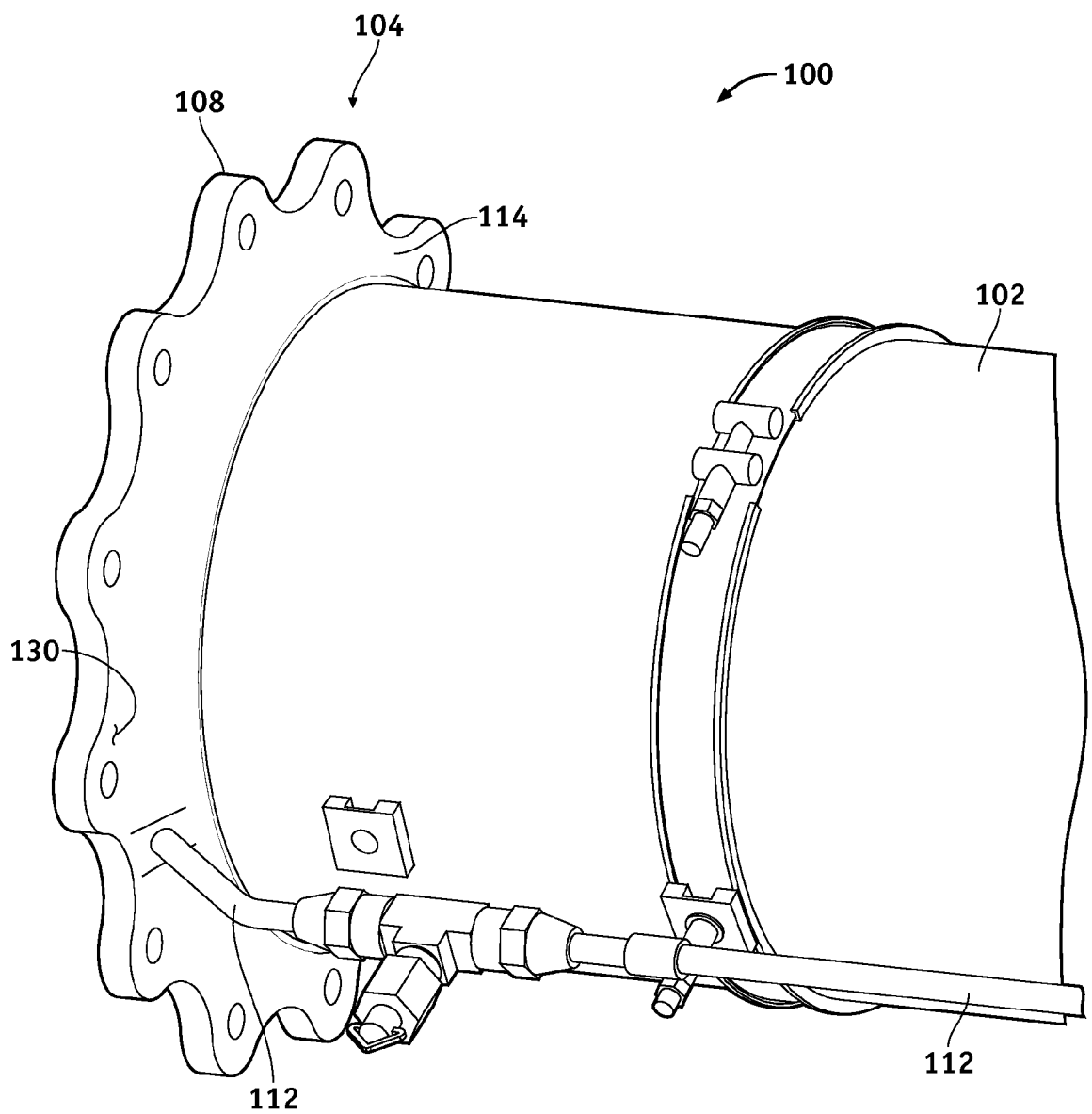
FIG. 3 is a perspective view of the detailed portion of the conduit section shown in FIG. 2, as viewed toward the back side of the flange fitting.
Figure 4:
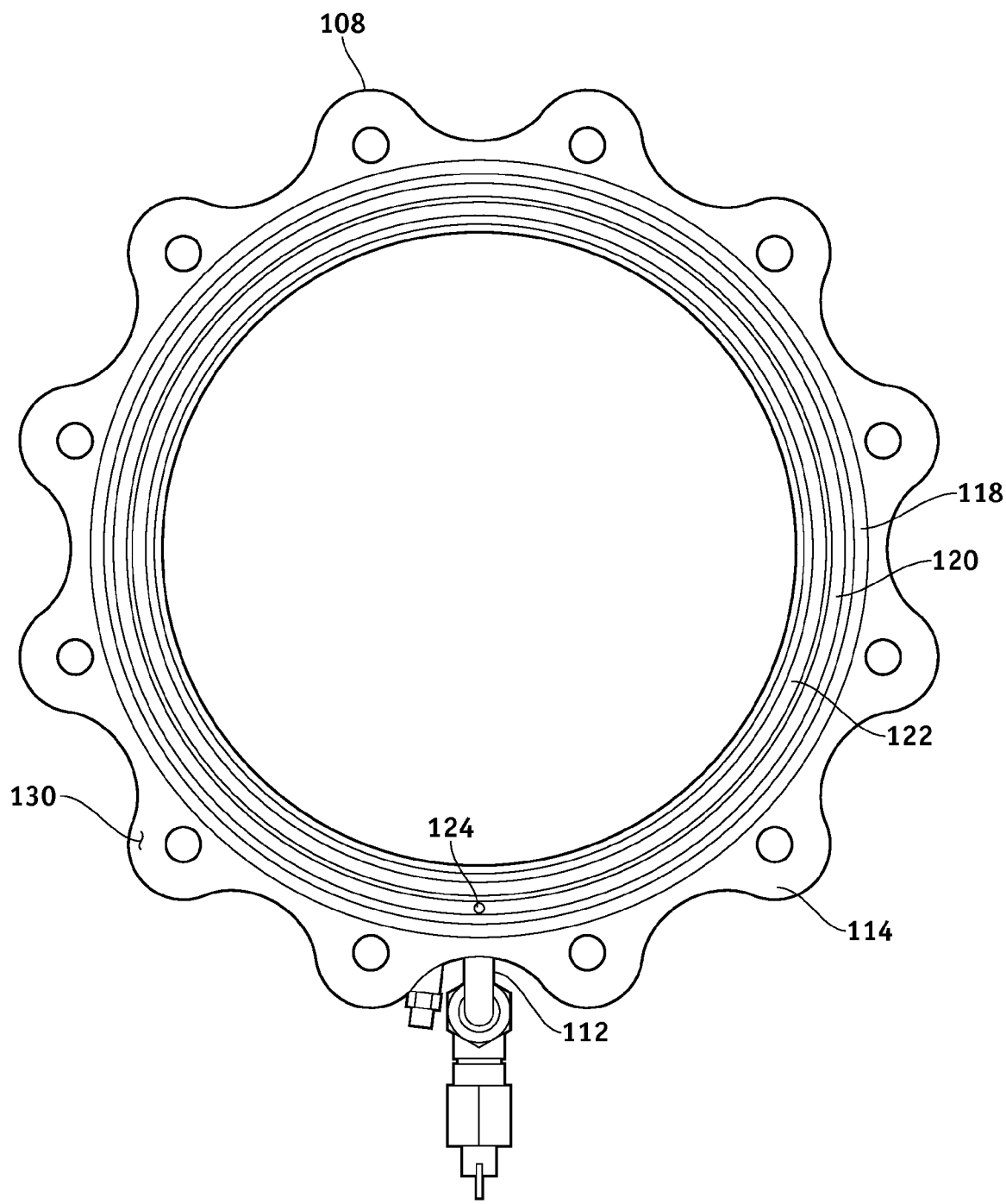
FIG. 4 is an end elevation view of the detailed portion of the conduit section shown in FIG. 2.
Figure 5:
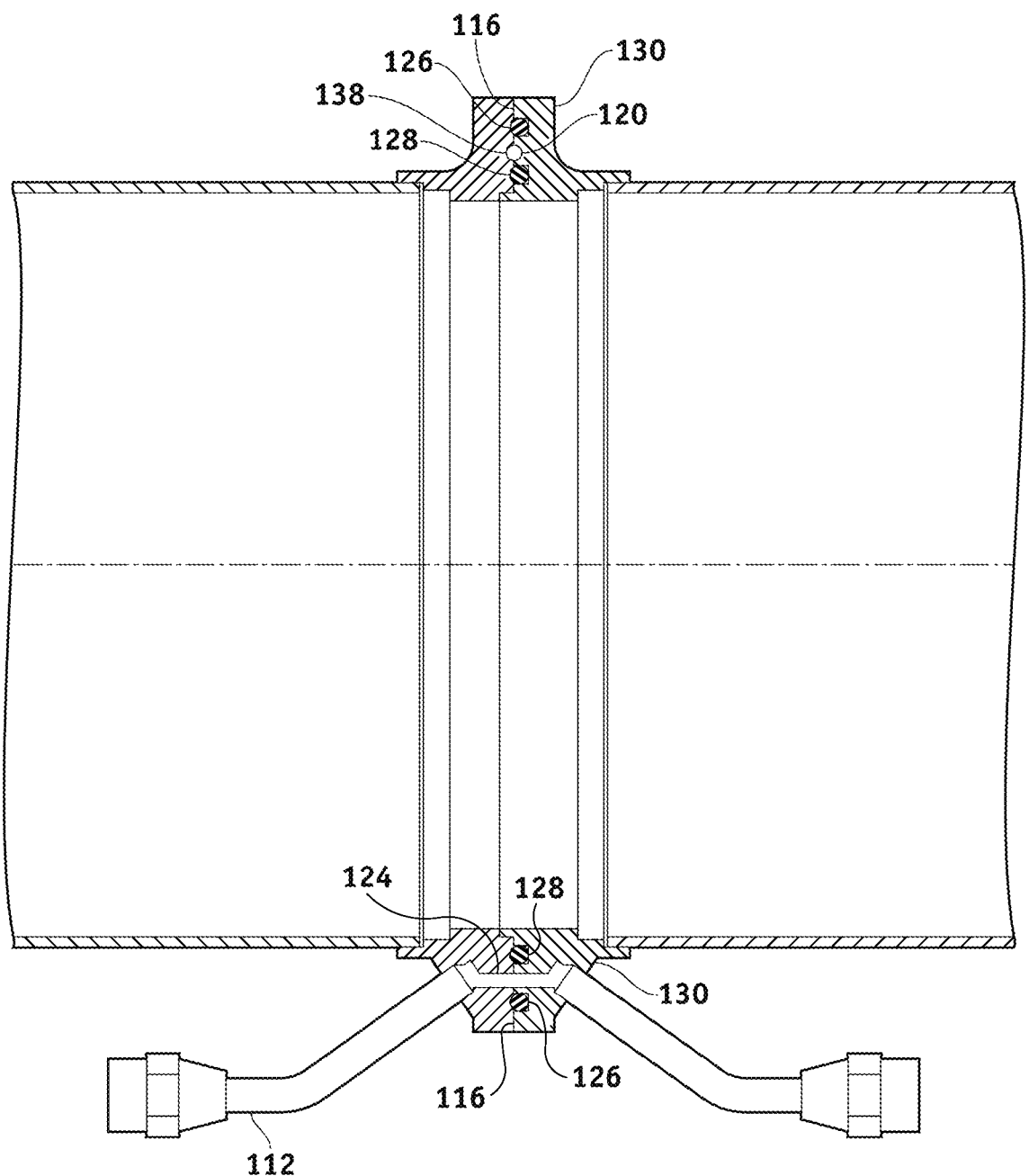
FIG. 5 is a cross sectional view of two single walled conduit sections coupled together by an embodiment of a flange fitting assembly.
Figure 6:
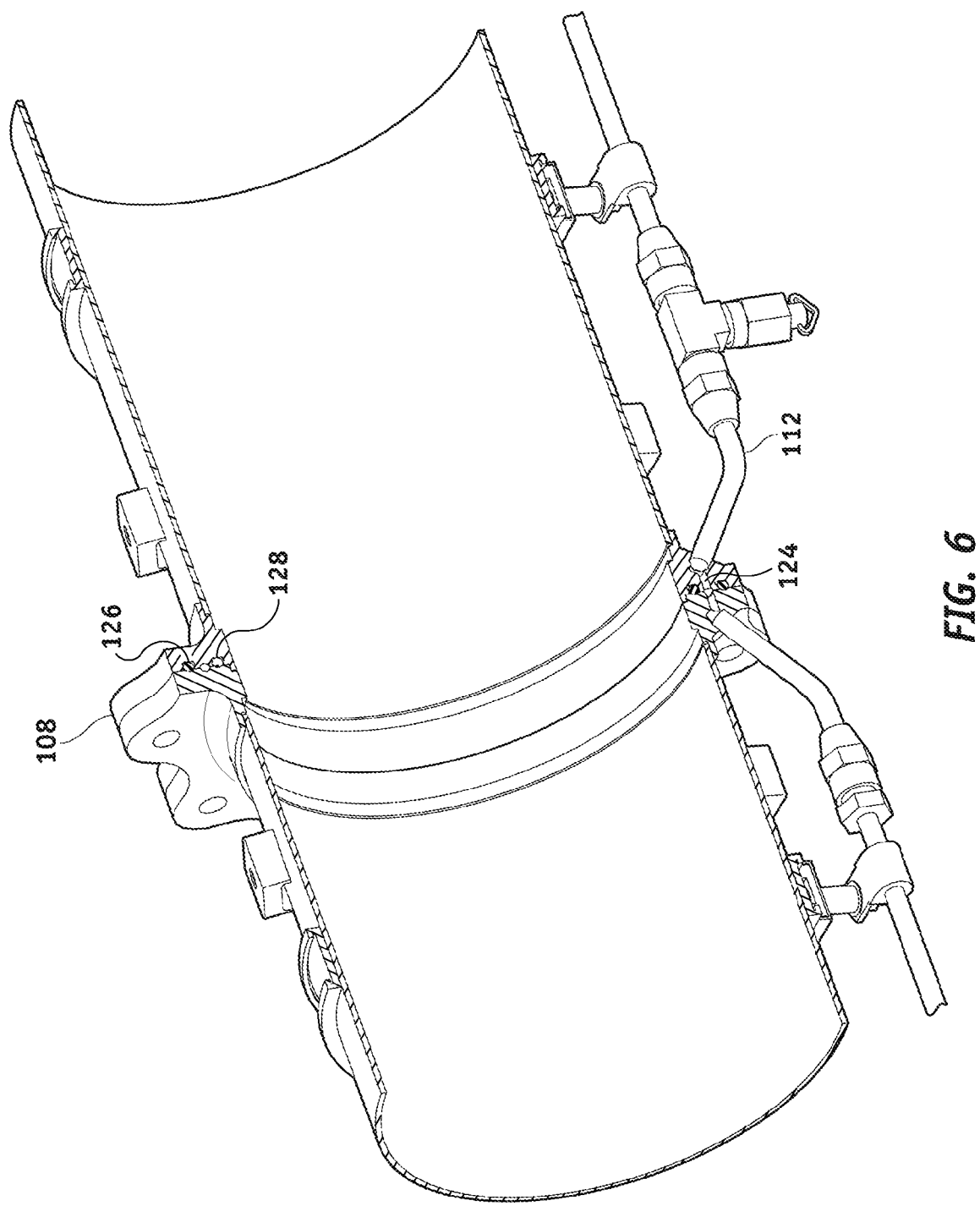
FIG. 6 is a perspective cross sectional view of the two conduit sections shown in FIG. 5.
Figure 7:
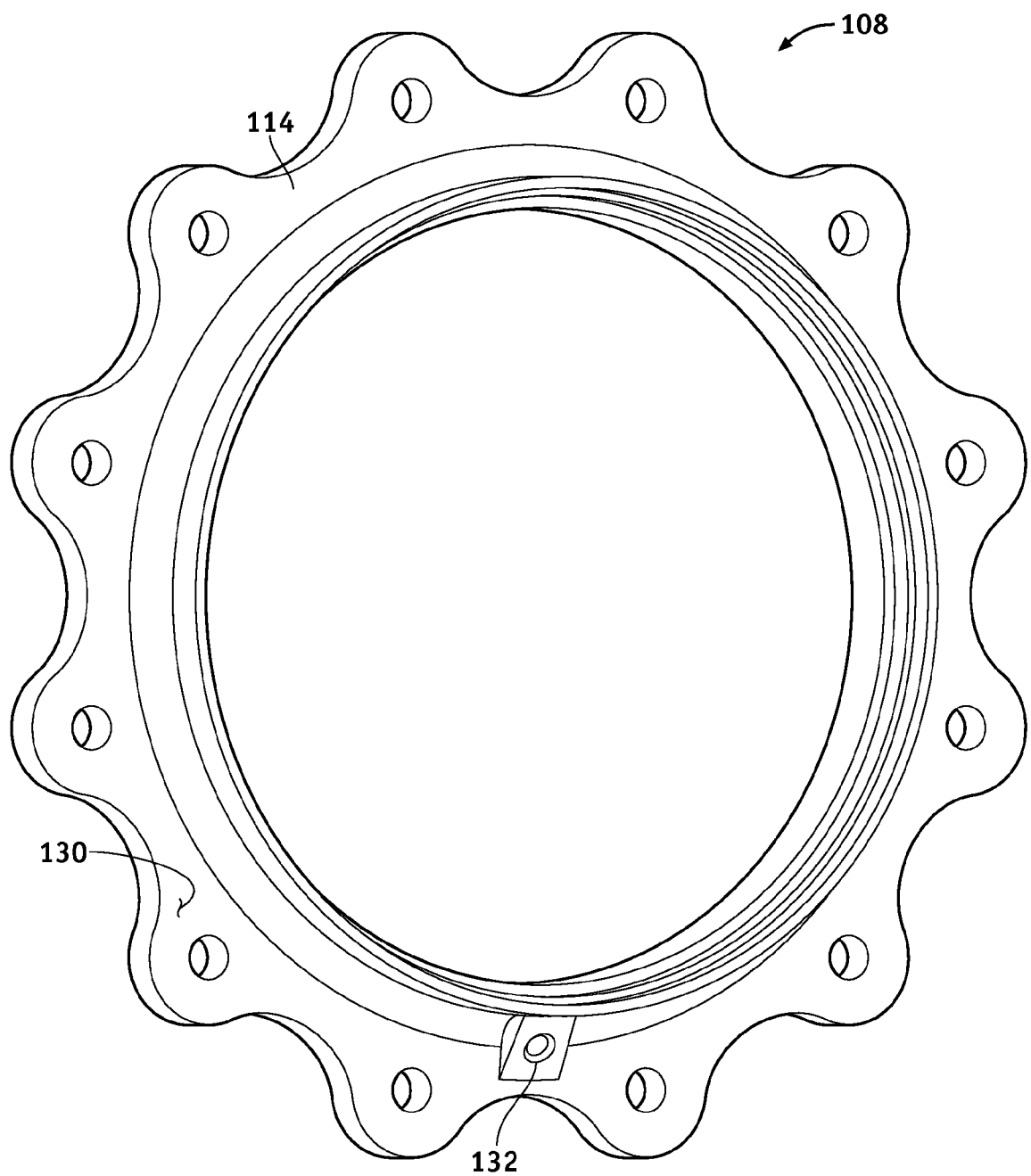
FIG. 7 is a perspective view of the flange fitting shown in FIGS. 1-4, as viewed from the back side.
Figure 8:
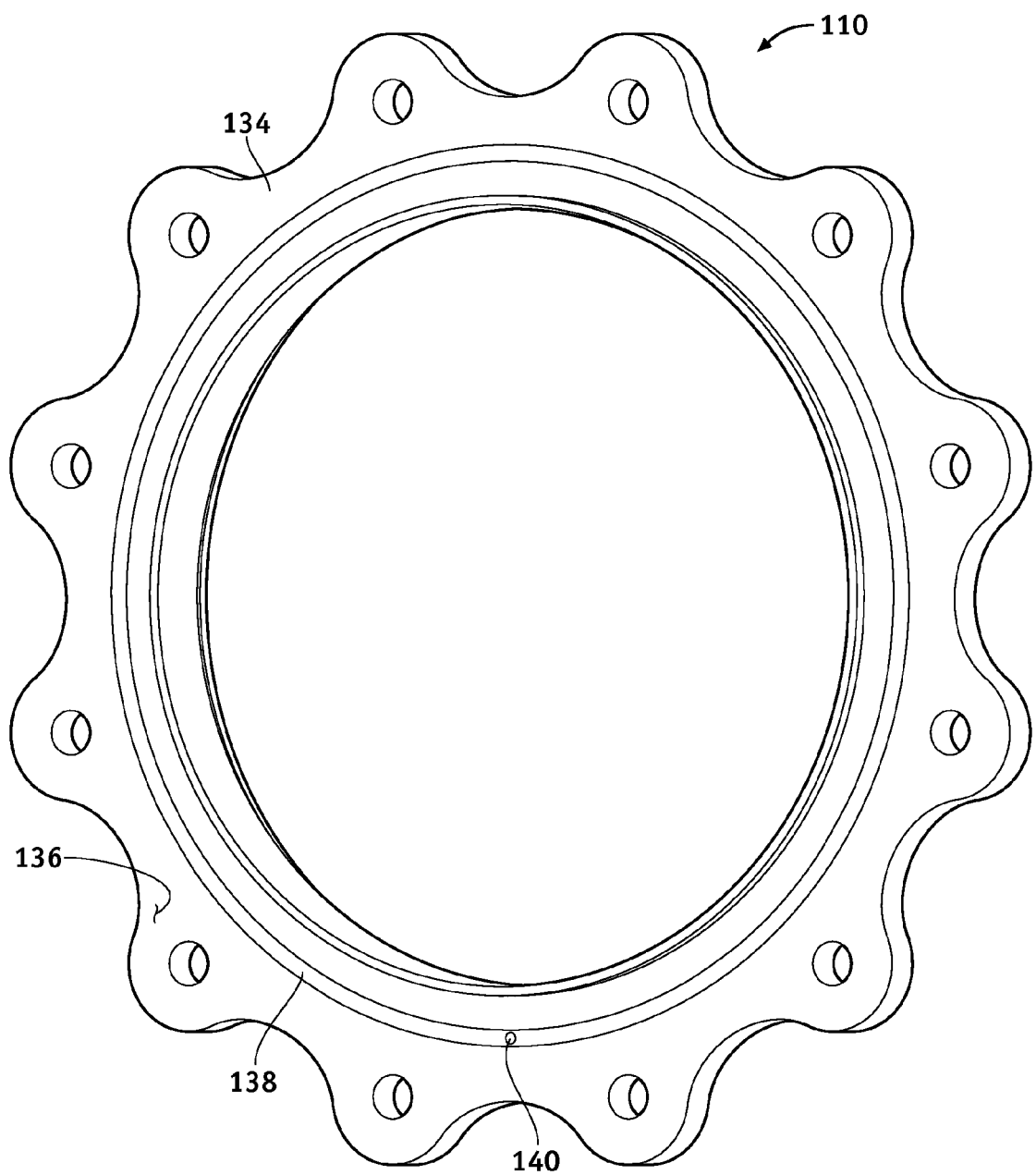
FIG. 8 is a perspective face view of the flange fitting depicted at the right side of FIG. 1.

FIG. 1 is a perspective view of an embodiment of a single walled conduit section 100 having a leak detection feature integrated therein. FIG. 2 is a perspective front view of a detailed portion of conduit section 100, FIG. 3 is a perspective rear view of the detailed portion of conduit section 100, and FIG. 4 is an end elevation view of the detailed portion of conduit section 100. FIG. 5 is a cross sectional view of two single walled conduit sections coupled together by an embodiment of a flange fitting assembly, and FIG. 6 is a perspective cross sectional view of the two conduit sections shown in FIG. 5. In addition, FIG. 7 is a perspective view of the flange fitting shown in FIGS. 1-4, as viewed from the back side, and FIG. 8 is a perspective face view of the flange fitting depicted at the right side of FIG. 1.

Conduit section 100 is suitably configured to carry any of a wide range of fluids (such as gases, liquids, or any flowing substance), regardless of whether the fluid is being used as a fuel. Accordingly, specific references to fuel, gases, or liquids herein should not be construed as limiting the scope of the described embodiments.

Conduit section 100 generally includes, without limitation: a fluid conduit 102 having a first end 104 and a second end 106; a first flange fitting 108 at first end 104; a second flange fitting 110 at second end 106; and a leakage collection conduit 112. First flange fitting 108 is coupled to (or is integrally formed with) first end 104 of conduit section 100 such that the respective opening 113 of conduit section 100 terminates at first flange fitting 108. Likewise, second flange fitting 110 is coupled to (or is integrally formed with) second end 106 of conduit section 100 such that the respective opening of conduit section 100 terminates at second flange fitting 110. First flange fitting 108 and second flange fitting 110 are suitably configured such that conduit section 100 can be coupled to additional conduit sections having compatible flange fittings that mate with first flange fitting 108 or second flange fitting 110. Alternatively, conduit section 100 may be connected by way of first flange fitting 108 and/or second flange fitting 110 to any one of a wide range of other fluid-conducting apparatus having compatible end fittings. In alternate embodiments, flange fitting 108 or flange fitting 110 can be replaced with an endcap or other component that serves to seal or cap an end of conduit section 100.

Fluid conduit 102, first flange fitting 108, and second flange fitting 110 are formed from a strong and fluid impermeable material that is resistant to the intended fluid to be transported, such as, without limitation: aluminum (e.g., 6061-T4 aluminum); stainless steel; plastic; a composite construction; or the like. In this regard, first flange fitting 108 and second flange fitting 110 can be welded onto fluid conduit 102 to form conduit section 100. Although the illustrated embodiments include generally cylindrical fluid conduits, other embodiments may employ conduits having different cross sectional shapes and configurations, such as rectangular, square, or elliptical conduits.

FIG. 5 is a side view of a cross section taken through the longitudinal axis of the conduits, and through a leak detection port 124 (described below). FIG. 6 is a perspective view of the same cross section. First flange fitting 108 and second flange fitting 110 are suitably configured to mate with each other such that, when two compatible conduit sections are coupled together, a fluid tight seal is formed between first flange fitting 108 and second flange fitting 110. Ideally, this fluid tight seal prevents the fluid carried by fluid conduit 102 from leaking outside fluid conduit 102. For this particular embodiment, first flange fitting 108 and second flange fitting 110 are not identical components. Although not a requirement in all embodiments, first flange fitting 108 is designed to be a seal-retaining component, while second flange fitting 110 is designed to be a seal-cooperating component, as described in more detail below.

Referring to FIGS. 2-4, first flange fitting 108 generally includes a flange body 114 having a number of features and elements formed therein. Flange body 114 represents the main portion of first flange fitting 108, and flange body 114 resides around the opening 113 of fluid conduit 102. In this embodiment, flange body 114 surrounds and completely encircles the opening 113, as shown in the figures. Flange body 114 includes a generally defined sealing face surface 116 (see FIG. 5) that corresponds to a common plane shared by certain prominent features of first flange fitting 108. Sealing face surface 116 cooperates and mates with the respective sealing face surface of the adjoining flange fitting.

As mentioned previously, flange body 114 includes a number of features and elements formed therein. These features include, without limitation: an outer seal groove 118; a leak detection passageway 120; an inner seal groove 122; and a leak detection port 124 (depicted in cross section in FIG. 5).

Due to the cylindrical form of this embodiment of fluid conduit 102, outer seal groove 118 is a ring shaped channel that encircles the opening 113 of fluid conduit 102. Outer seal groove 118 is suitably sized and shaped to accommodate a seal, sealing compound, a ring seal, a gasket, or the like. For this embodiment, outer seal groove 118 receives and retains an outer ring seal 126 as depicted in FIG. 5, positioned around the opening 113. When deployed in this manner, outer ring seal 126 remains positioned around the opening 113 of fluid conduit 102. When the two flange fittings are coupled together as shown in FIG. 5, outer ring seal 126 gets compressed within outer seal groove 118, forming a fluid tight seal between the flange fittings. Inner seal groove 122 is similarly configured to accommodate a seal, sealing compound, a ring seal, a gasket, or the like. For this embodiment, inner seal groove 122 receives and retains an inner ring seal 128 as shown in FIG. 5, positioned around the opening 113. When deployed in this manner, inner ring seal 128 remains positioned around the opening 113 of fluid conduit 102, and it remains located between fluid conduit 102 and leak detection passageway 120. Moreover, outer ring seal 126 remains located around inner ring seal 128. As best shown in FIG. 4, a relatively thin cylindrical wall of material separates inner seal groove 122 from the interior space within fluid conduit 102.

Leak detection passageway 120, which terminates at sealing face surface 116, resides between outer seal groove 118 and inner seal groove 122. As best depicted in FIG. 4, relatively thin cylindrical walls of material separate outer seal groove 118 and inner seal groove 122 from leak detection passageway 120. Due to the cylindrical form of this embodiment of fluid conduit 102, leak detection passageway 120 is realized as a ring shaped channel that encircles the opening 113 of fluid conduit 102. In this regard, outer seal groove 118, leak detection passageway 120, and inner seal groove 122 are formed within flange body 114 as three generally concentric ringed grooves.

For this embodiment, outer ring seal 126 and inner ring seal 128 cooperate to seal leak detection passageway 120 between sealing face surface 116 and the cooperating flange fitting. Moreover, inner seal ring 128 is suitably configured to nominally seal leak detection passageway 120 from fluid conduit 102. As used here, "nominally seal" means that under normal and intended operating conditions an actual fluid seal is maintained to at least the minimum specifications. Thus, although a seal might be configured to "nominally seal" something, under unexpected or unusual circumstances that seal might not maintain a true sealed condition. For example, such a nominal seal might be broken if the pressure of the fluid contained in fluid conduit 102 exceeds the intended design limits, if the cooperating flange fittings are not adequately coupled together, or the like.

Leak detection port 124 is arranged such that it is in fluid communication with leak detection passageway 120. As described in more detail below, leak detection port 124 is suitably configured for fluid communication with a leak sensing/detecting apparatus or system. Referring to FIG. 2, FIG. 4, and FIG. 5, this embodiment of leak detection port 124 terminates at leak detection passageway 120. Moreover, referring to FIG. 5, leak detection port 124 provides a fluid path between leak detection passageway 120 and the back surface 130 of flange body 114 (where back surface 130 is opposite sealing face surface 116 of flange body 114). As shown in FIG. 5, leak detection port 124 may be realized as a hole drilled or milled through flange body 114 in a direction approximately perpendicular to the plane defined by sealing face surface 116. This particular embodiment utilizes only one leak detection port 124 for leak detection passageway 120; any number of leak detection ports can be used in alternate embodiments.

FIG. 7 is a perspective view of flange fitting 108, as viewed from its back side, i.e., the side opposite the front or end side. For clarity, FIG. 7 does not show the fluid conduit that would normally be attached to flange fitting 108. As described above, leak detection port 124 is preferably arranged to be in fluid communication with a leak sensing apparatus or system (not shown). Accordingly, flange body 114 may include an outlet 132 for leak detection port 124. Outlet 132 can be suitably configured to receive leakage collection conduit 112. For example, outlet 132 may represent a threaded hole, a fitting, a hole sized to accommodate a press fit with leakage detection conduit 112, a connector, or the like. Outlet 132 facilitates coupling of leakage collection conduit 112 to leak detection port 124. In turn, an appropriate leak detector, sensor, system, or apparatus can be coupled to leakage collection conduit 112 for purposes of sensing fluid leakage into leak detection passageway 120 and/or into leakage detection port 124.

As mentioned above, second flange fitting 110 need not be identical to first flange fitting 108. In this particular embodiment, second flange fitting 110 mates with first flange fitting 108, and second flange fitting 110 cooperates with the seals of first flange fitting 108. For ease of description, FIG. 8 is a perspective face view of second flange fitting 110, shown without fluid conduit 102. The back side of second flange fitting 110 is similar to that depicted in FIG. 7, and as such it will not be redundantly described here. Second flange fitting 110 includes a flange body 134 having a sealing face surface 136 that is configured to mate with a cooperating flange fitting (such as one having the characteristics of first flange fitting 108).

Unlike first flange fitting 108, second flange fitting 110 need not have any seal grooves formed therein. Rather, sealing face surface 136 itself serves as a cooperating surface that contacts and compresses the seals of the cooperating flange fitting. FIG. 5 and FIG. 6 illustrate this feature. In this embodiment, second flange fitting 110 includes a leak detection passageway 138 and a leak detection port 140 formed therein. Leak detection passageway 138 and leak detection port 140 are similar to their respective counterparts described above for first flange fitting 108. Notably, leak detection passageway 138 is preferably shaped, sized, and configured such that it aligns with the leak detection passageway in the cooperating flange fitting when the two flange fittings are connected together (as shown in FIG. 5 and FIG. 6). Indeed, the two opposing leak detection passageways cooperate and combine to form a leak detection duct when the two flange fittings are coupled together. Consequently, leak detection port 140 is maintained in fluid communication with the leak detection passageway and with the leak detection port of the cooperating flange fitting.

Referring again to FIG. 5 and FIG. 6, the leak detection duct formed by the two opposing leak detection passageways is sealed between the sealing face surfaces of the two flange fittings. Moreover, the ring seals function to nominally isolate the leak detection duct from the interior of the fluid conduit. Thus, the leak detection duct ideally remains void of the fluid passing through the fluid conduit absent a leak condition.

Referring back to FIG. 1, this particular embodiment of leakage collection conduit 112 spans the length of fluid conduit 102 between first flange fitting 108 and second flange fitting 110. Thus, one end of leakage collection conduit 112 is coupled to the leak detection port of first flange fitting 108, and the other end of leakage collection conduit 112 is coupled to the leak detection port of second flange fitting 110. The T-shaped fitting 142 of leakage collection conduit 112 can be utilized as a coupling point for additional conduit, hoses, pipes, or tubes, which in turn can be routed to one or more leak detectors or sensors for purposes of monitoring the contents of leakage collection conduit 112.

Figure 9:
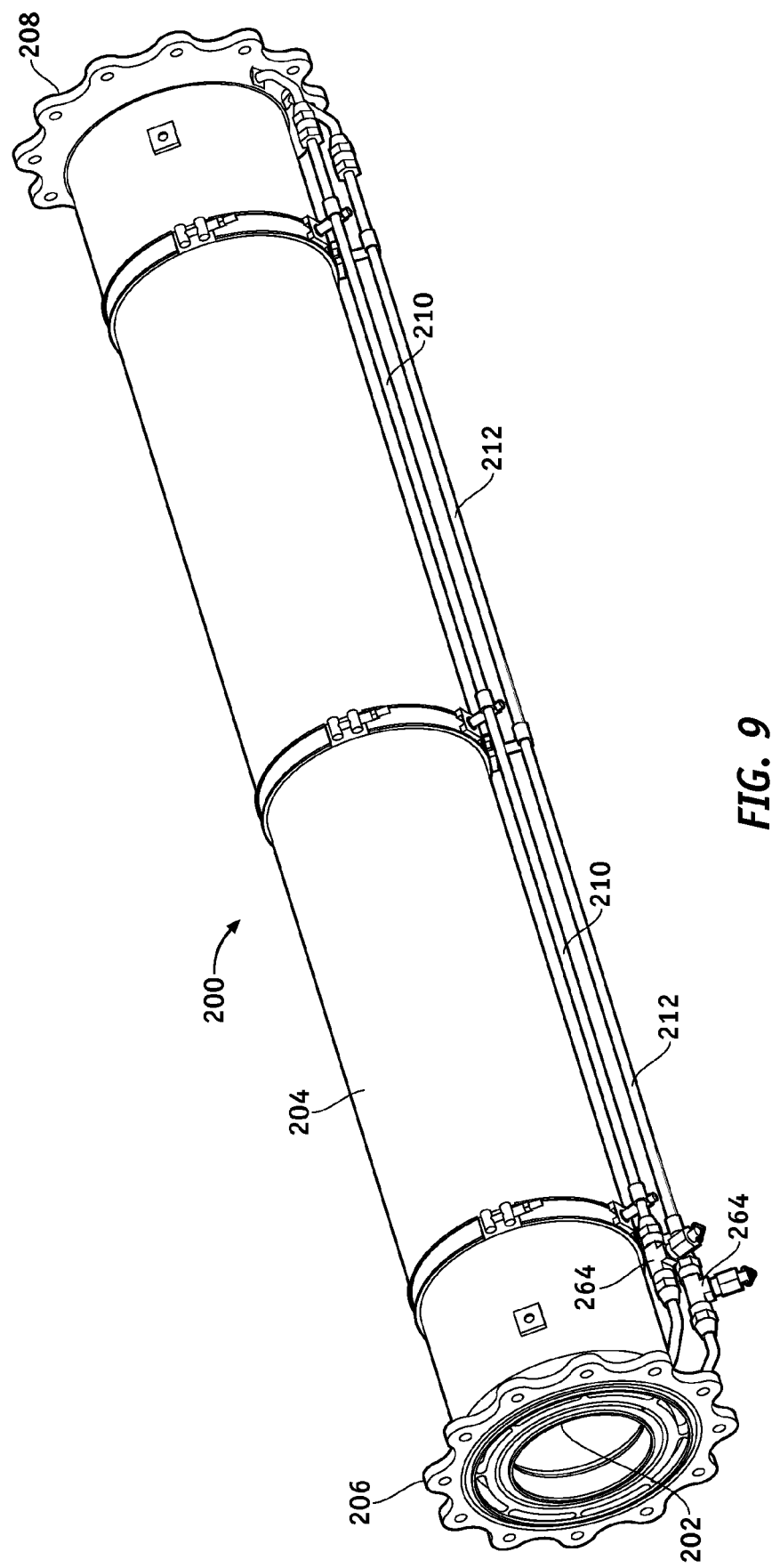
FIG. 9 is a perspective view of an embodiment of a double walled conduit section.
Figure 10:
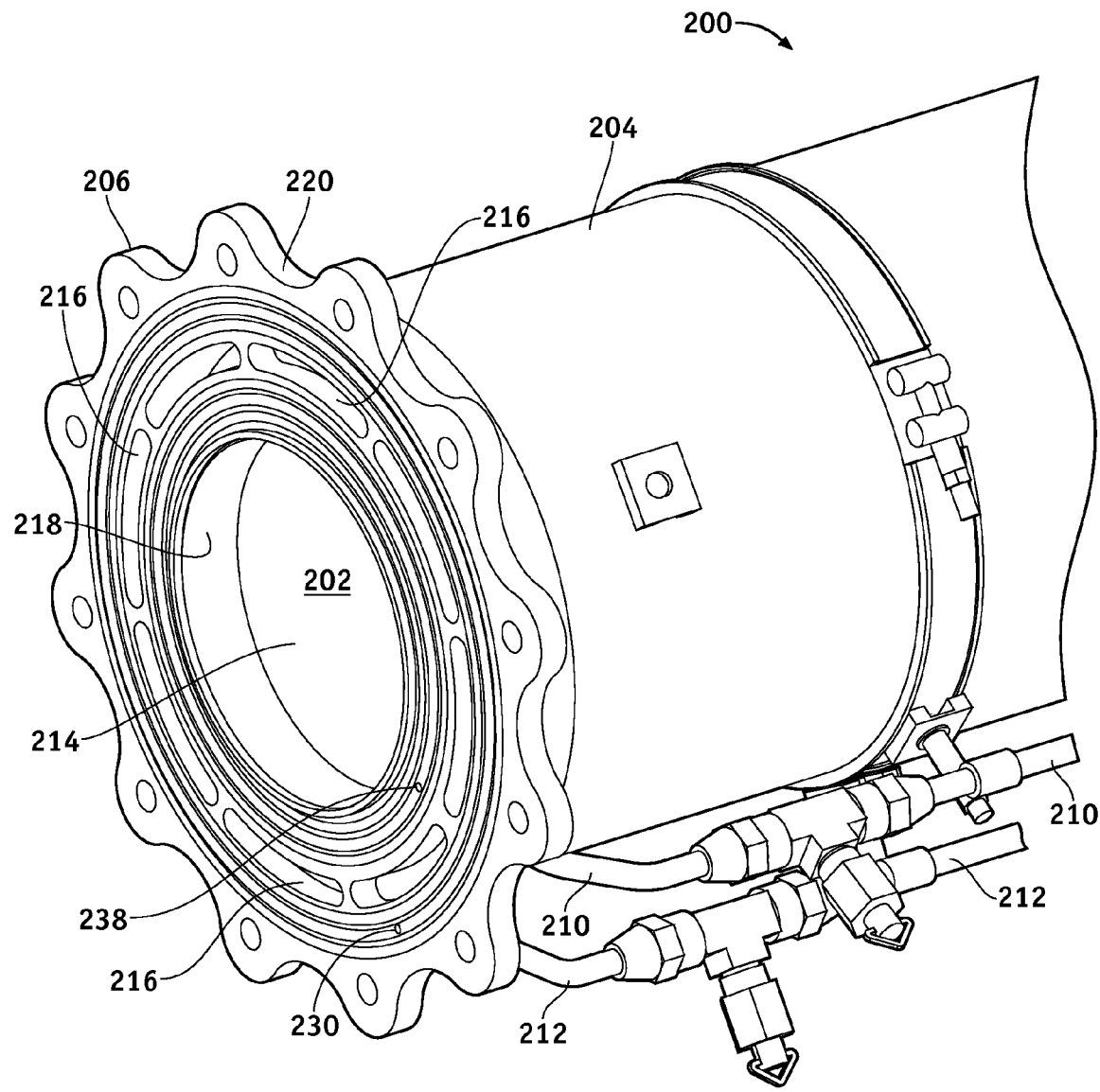
FIG. 10 is a perspective view of a detailed portion of the conduit section shown in FIG. 9.
Figure 11:
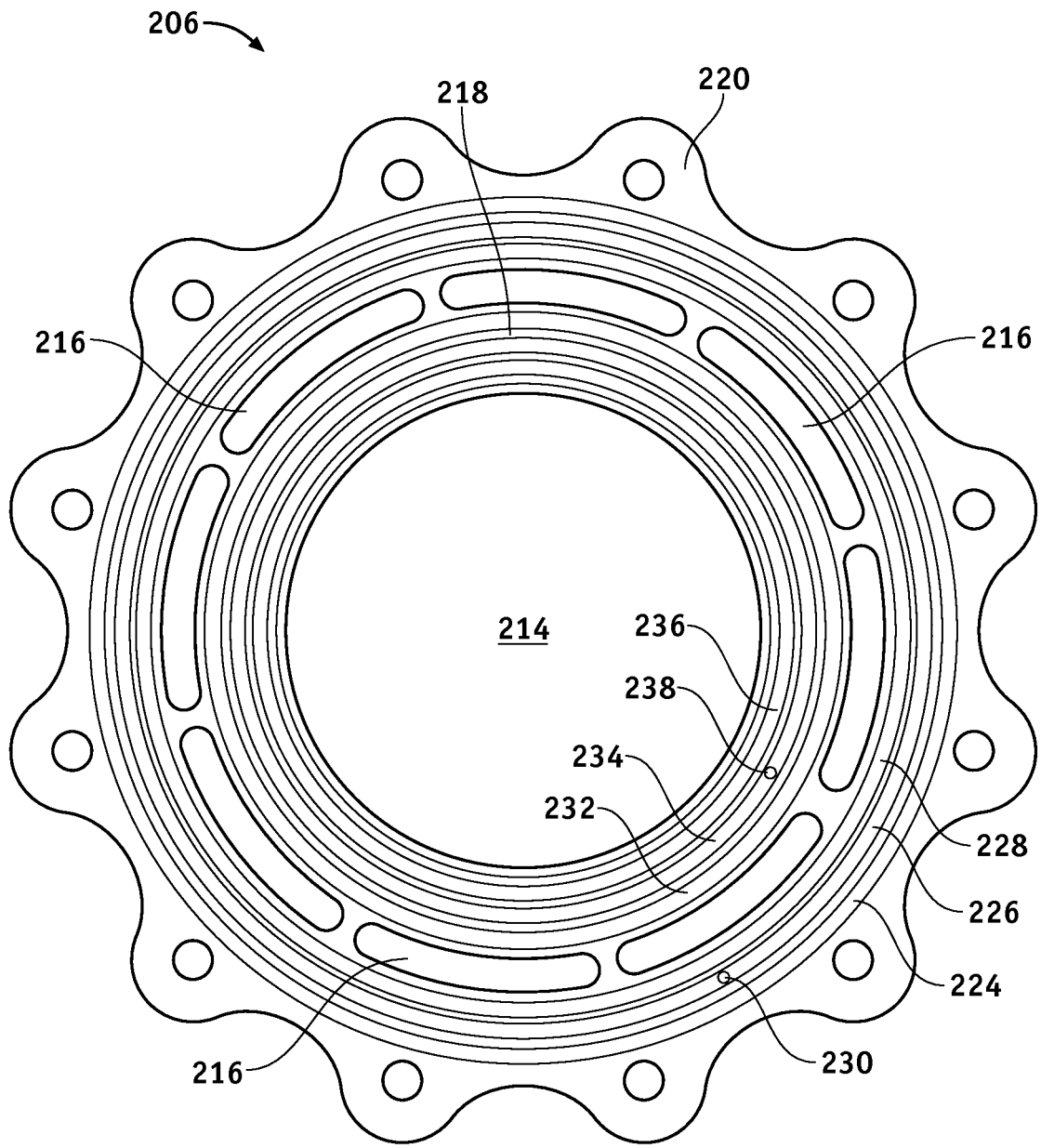
FIG. 11 is an end elevation view of the detailed portion of the conduit section shown in FIG. 10.
Figure 12:
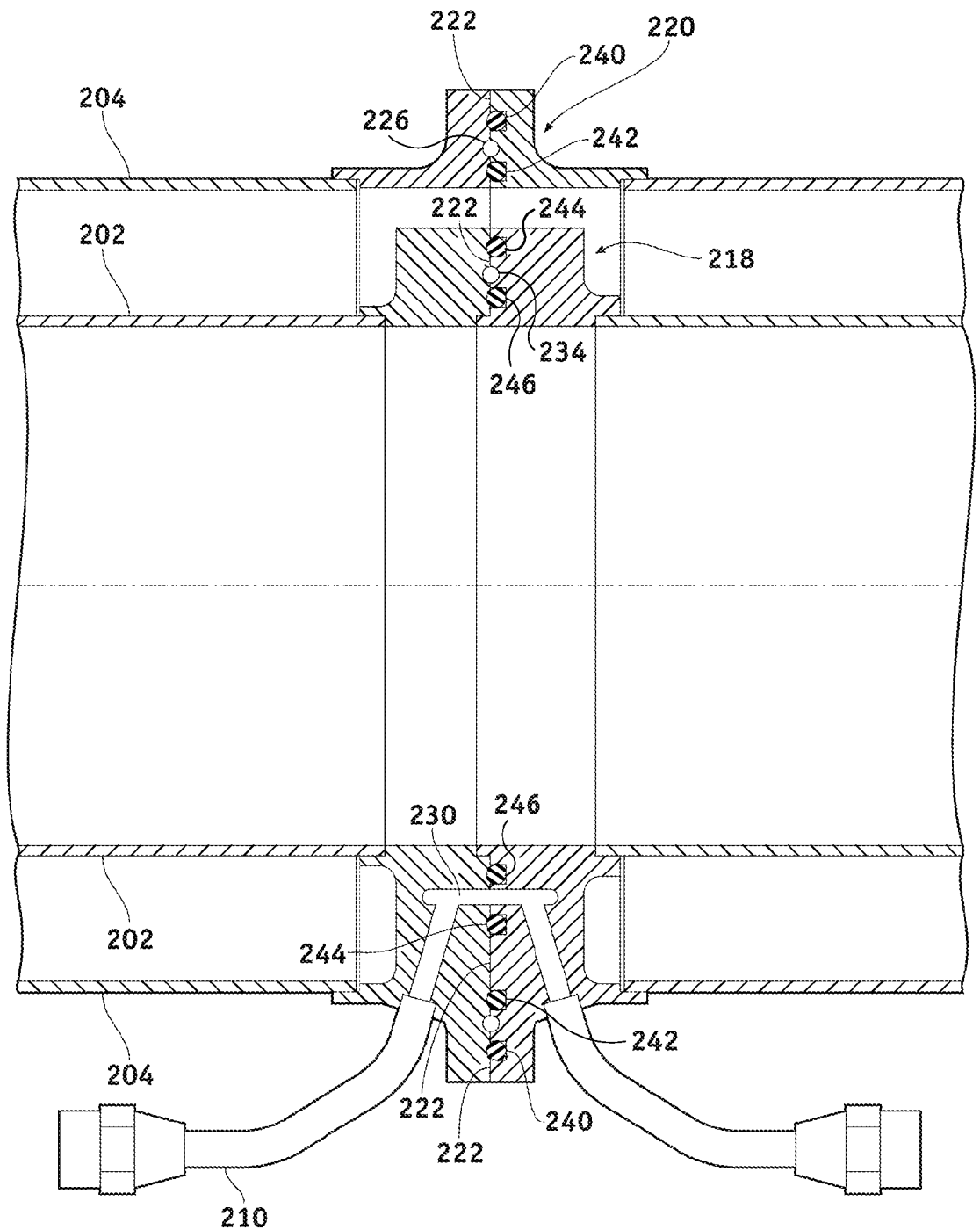
FIG. 12 is a cross sectional view of two double walled conduit sections coupled together by an embodiment of a flange fitting assembly.
Figure 13:
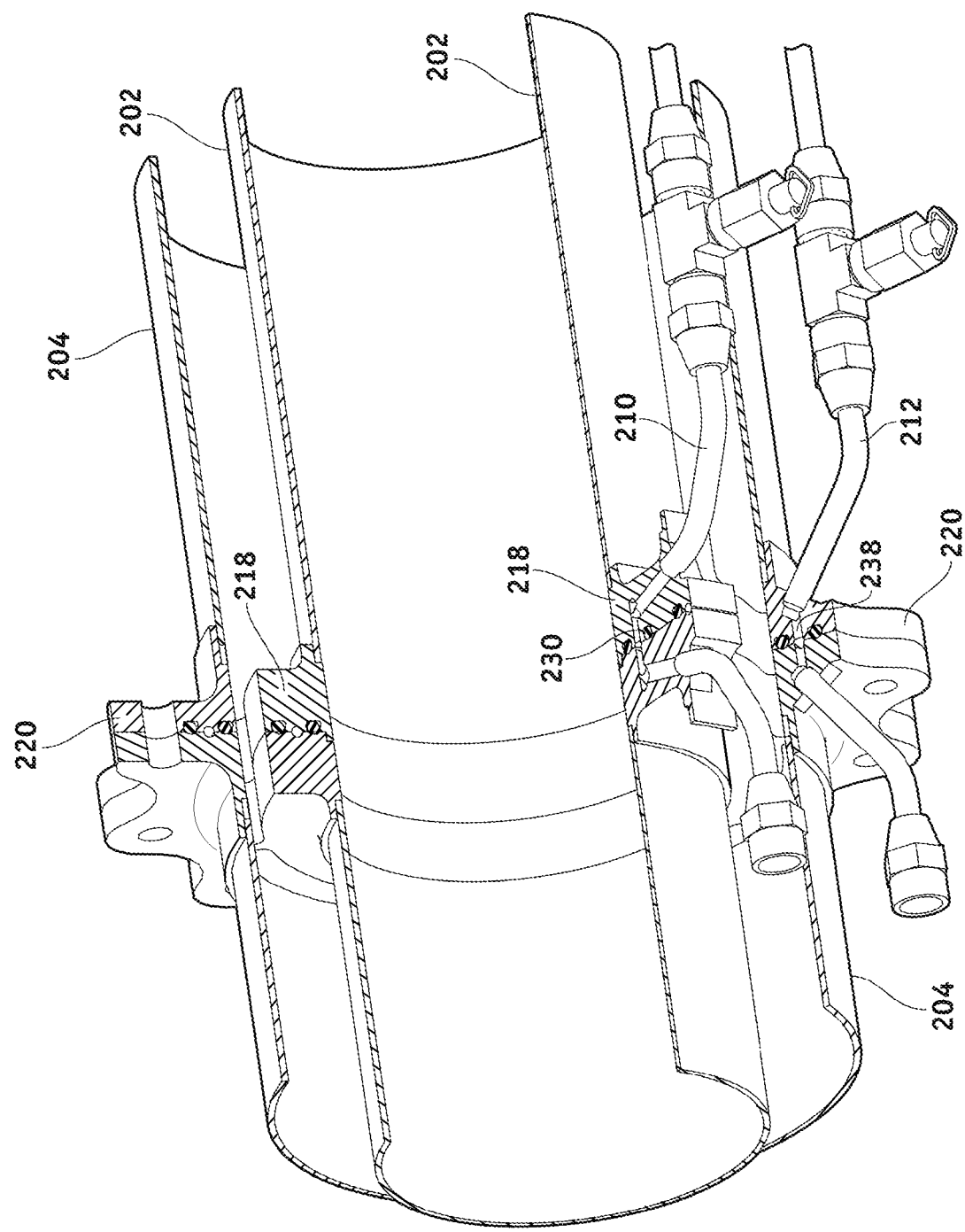
FIG. 13 is a perspective cross sectional view of the two conduit sections shown in FIG. 12.
Figure 14:
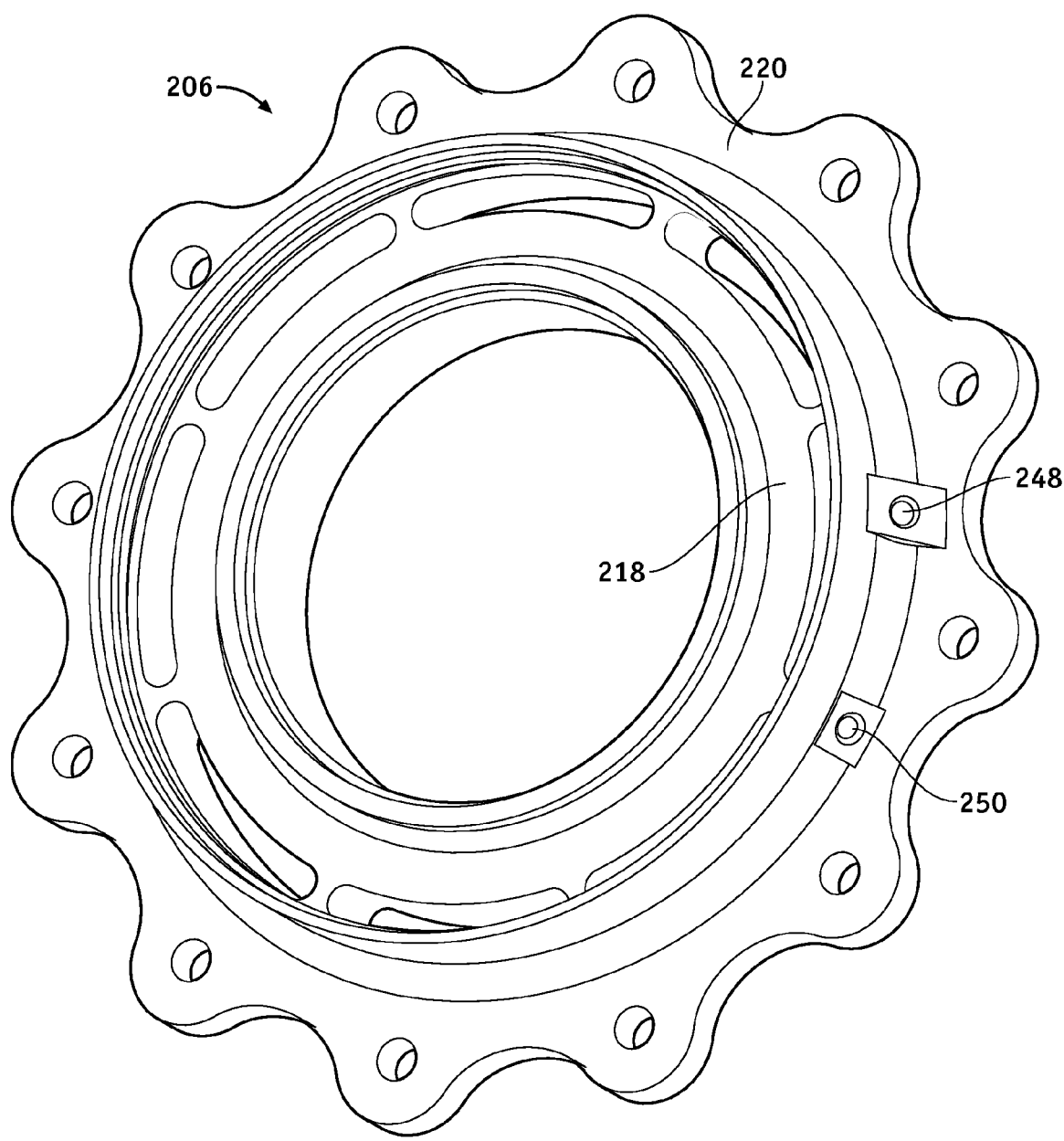
FIG. 14 is a perspective view of the flange fitting shown in FIGS. 9-11, as viewed from the back side.
Figure 15:
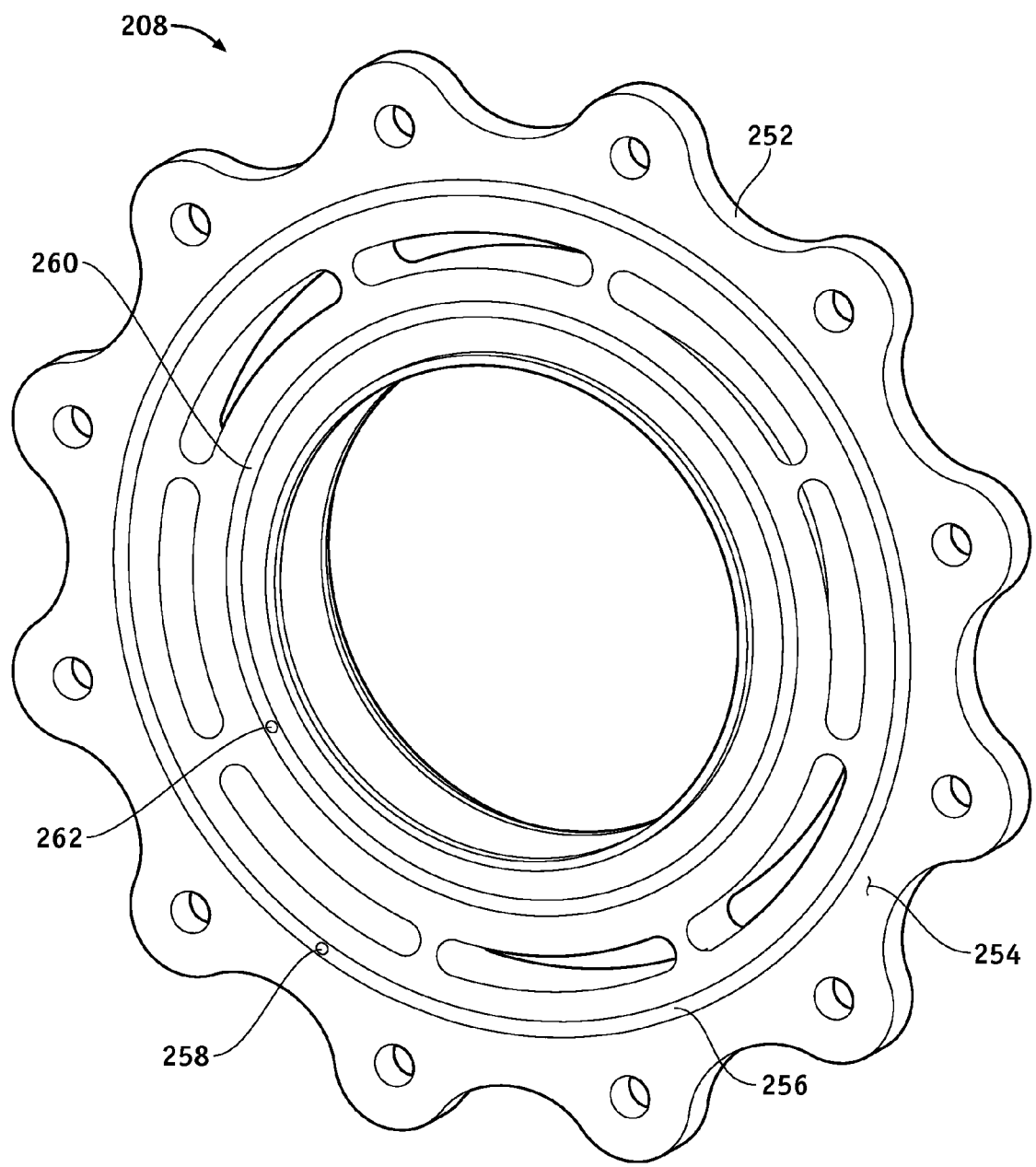
FIG. 15 is a perspective face view of the flange fitting depicted at the right side of FIG. 9.

FIGS. 9-15 illustrate an alternate embodiment that employs a double walled conduit construction. More specifically, FIG. 9 is a perspective view of an embodiment of a double walled conduit section 200, FIG. 10 is a perspective view of a detailed portion of conduit section 200; FIG. 11 is an end elevation view of the detailed portion of conduit section 200; FIG. 12 is a cross sectional view of two double walled conduit sections coupled together; FIG. 13 is a perspective cross sectional view of the two conduit sections shown in FIG. 12; FIG. 14 is a perspective view of the flange fitting shown in FIGS. 9-11, as viewed from the back side; and FIG. 15 is a perspective face view of the flange fitting depicted at the right side of FIG. 9. Notably, certain elements, features, and characteristics of conduit section 200 are similar or identical to corresponding elements, features, and characteristics of conduit section 100 described above. For the sake of brevity and clarity, such common aspects will not be redundantly described in the context of conduit section 200.

Conduit section 200 includes an inner fluid conduit 202 and an outer fluid conduit 204 that surrounds inner fluid conduit 202. This structure is sometimes referred to as a shrouded conduit. Outer fluid conduit 204 includes a lumen that is sized to receive inner fluid conduit 202. Inner fluid conduit 202 includes a lumen that allows for a fluid flow (e.g., gases and liquids) through inner fluid conduit 202. In certain embodiments, outer fluid conduit 204 may be used to concurrently carry another (or the same) fluid without mixing that fluid with the fluid contained in inner fluid conduit 202. In other words, the interior space within inner fluid conduit 202 represents one fluid transport conduit, while the space defined between inner fluid conduit 202 and outer fluid conduit 204 represents a second fluid transport conduit. Ideally, and under nominal operating conditions, these two fluid transport conduits are fluidly sealed from each other. Inner fluid conduit 202 and outer fluid conduit 204, along with associated support structure, may be generally constructed in accordance with suitable techniques and technologies, such as those described in U.S. Pat. No. 6,848,720 (the relevant content of which is incorporated by reference herein).

Conduit section 200 generally includes, without limitation: a first flange fitting 206 at one end; a second flange fitting 208 at the other end; an inner leakage collection conduit 210; and an outer leakage collection conduit 212. First flange fitting 206 is coupled to (or is integrally formed with) the first end of conduit section 200 such that the opening(s) 214 of inner fluid conduit 202 terminate at first flange fitting 206, and such that the opening(s) 216 of outer fluid conduit 204 terminate at first flange fitting 206. In the illustrated embodiment, a web structure in first flange fitting 206 forms a plurality of openings 216 for outer fluid conduit 204. Likewise, second flange fitting 208 is coupled to (or is integrally formed with) the second end of conduit section 200 such that the openings of inner fluid conduit 202 and outer fluid conduit 204 terminate at second flange fitting 208.

First flange fitting 206 and second flange fitting 208 are suitably configured to mate with each other such that, when two compatible conduit sections are coupled together, a fluid tight seal is formed between first flange fitting 206 and second flange fitting 208. Ideally, this fluid tight seal prevents the fluid carried by inner fluid conduit 202 from leaking into outer fluid conduit 204, and vice versa. For this particular embodiment, first flange fitting 206 and second flange fitting 208 are not identical components. Although not a requirement in all embodiments, first flange fitting 206 is designed to be a seal-retaining component, while second flange fitting 208 is designed to be a seal-cooperating component, as described in more detail below.

FIG. 12 is a side view of a cross section taken through the longitudinal axis of the conduits, and through an inner leak detection port 230 (described below). FIG. 13 is perspective view that combines a cross section taken through inner leak detection port 230 with a cross section taken through an outer leak detection port 238 (described below). FIG. 13 is a cutaway view of the flange fitting assembly that conveniently shows the configuration of these leak detection ports 230/238. Referring to FIGS. 10, 11, and 14, first flange fitting 206 generally includes a flange body having an inner portion 218 and an outer portion 220, each having a number of features and elements formed therein. The inner portion 218 of the flange body represents one primary section of first flange fitting 206, and inner portion 218 resides around the opening 214 of inner fluid conduit 202. In this embodiment, inner portion 218 surrounds and completely encircles the opening 214, as shown in the figures. The outer portion 220 of the flange body represents another primary section of first flange fitting 206, and outer portion 220 resides around the openings 216 associated with outer fluid conduit 204. In this embodiment, outer portion 220 surrounds and completely encircles the pattern of openings 216, and surrounds and completely encircles inner fluid conduit 202, as shown in the figures. The flange body includes a generally defined sealing face surface 222 (see FIG. 12) that corresponds to a common plane shared by certain prominent features of first flange fitting 206. Sealing face surface 222 cooperates and mates with the respective sealing face surface of the adjoining flange fitting.

The features and elements formed in the outer portion 220 of first flange fitting 206 include, without limitation: an outermost seal groove 224; an outer leak detection passageway 226; an outer intermediate seal groove 228; and an outer leak detection port 230. The features and elements formed in the inner portion 218 of first flange fitting 206 include, without limitation: an inner intermediate seal groove 232; an inner leak detection passageway 234; an innermost seal groove 236; and an inner leak detection port 238. Leak detection ports 230/238 are depicted in cross section in FIG. 12 and FIG. 13. Due to the cylindrical form of this embodiment of conduit section 200, outermost seal groove 224 is a ring shaped channel that encircles the group of openings 216 of outer fluid conduit 204. For this embodiment, outermost seal groove 224 receives and retains an outermost ring seal 240 as depicted in FIG. 12. When deployed in this manner, outermost ring seal 240 remains positioned around the openings 216 and it runs around the perimeter of first flange fitting 206. Outer intermediate seal groove 228 is similarly configured to accommodate a seal, sealing compound, a ring seal, a gasket, or the like. For this embodiment, outer intermediate seal groove 228 receives and retains an outer intermediate ring seal 242 as shown in FIG. 12. When deployed in this manner, outer intermediate ring seal 242 remains positioned around the openings 216 and it runs around the perimeter of first flange fitting 206, and it remains located between outer fluid conduit 204 and outer leak detection passageway 226. Moreover, outermost ring seal 240 remains located around outer intermediate ring seal 242.

The design, configuration, and functionality of outermost seal groove 224, outermost ring seal 240, outer leak detection passageway 226, outer intermediate seal groove 228, outer intermediate ring seal 242, and outer leak detection port 230 are similar to that described above for first flange fitting 108 of conduit section 100. This leak detection feature is primarily designed to facilitate the detection of fluid leakage from outer fluid conduit 204. In practice, however, this leak detection feature can also facilitate the detection of fluid leakage from inner fluid conduit 202 (to the extent that fluid also leaks out of the outer fluid conduit 204).

Conduit section 200 also includes a leak detection feature for inner fluid conduit 202. Due to the cylindrical form of this embodiment of conduit section 200, inner intermediate seal groove 232 is a ring shaped channel that encircles the opening 214 of inner fluid conduit 202. For this embodiment, inner intermediate seal groove 232 receives and retains an inner intermediate ring seal 244 as depicted in FIG. 12. When deployed in this manner, inner intermediate ring seal 244 remains positioned around the opening 214, around inner leak detection passageway 234, and around innermost seal groove 236. Innermost seal groove 236 is similarly configured to accommodate a seal, sealing compound, a ring seal, a gasket, or the like. For this embodiment, innermost seal groove 236 receives and retains an innermost ring seal 246 as shown in FIG. 12. When deployed in this manner, innermost ring seal 246 remains positioned around the opening 214, and it remains located between inner fluid conduit 202 and inner leak detection passageway 234. Moreover, inner intermediate ring seal 244 remains located around innermost ring seal 246.

The design, configuration, and functionality of inner intermediate seal groove 232, inner intermediate ring seal 244, inner leak detection passageway 234, innermost seal groove 236, innermost ring seal 246, and inner leak detection port 238 are similar to that described above for first flange fitting 108 of conduit section 100. Inner intermediate ring seal 244 and innermost ring seal 246 are suitably configured and positioned to nominally seal inner fluid conduit 202 from outer fluid conduit 204 when two cooperating flange fittings are coupled together. Moreover, this leak detection feature facilitates the detection of fluid leakage from outer fluid conduit 204 into inner leak detection passageway 234 and/or fluid leakage from inner fluid conduit 202 into inner leak detection passageway 234.

Outer leak detection port 230 is arranged such that it is in fluid communication with outer leak detection passageway 226, and inner leak detection port 238 is arranged such that it is in fluid communication with inner leak detection passageway 234. As described in more detail below, leak detection ports 230/238 are suitably configured for fluid communication with a leak sensing/detecting apparatus or system. Referring to FIG. 12 and FIG. 13, inner leak detection port 230 provides a fluid path between inner leak detection passageway 234 and the back surface of the flange body (where the back surface is opposite sealing face surface 222 of the flange body). Notably, inner leak detection port 230 is suitably configured to provide a fluid outlet through a bulk portion of flange body. In contrast, outer leak detection port 238 need not pass through as much material (see, for example, FIG. 5).

FIG. 14 is a perspective view of flange fitting 206, as viewed from its back side, i.e., the side opposite the front or end side. For clarity, FIG. 14 does not show the fluid conduits that would normally be attached to flange fitting 206. As described above, leak detection ports 230/238 are preferably arranged to be in fluid communication with a leak sensing apparatus or system (not shown). Accordingly, flange fitting 206 may include a first outlet 248 for outer leak detection port 238, and a second outlet 250 for inner leak detection port 230. First outlet 248 is suitably configured to receive outer leakage collection conduit 212, and second outlet 250 is suitably configured to receive inner leakage collection conduit 210.

For this particular embodiment, second outlet 250 and inner leak detection port 230 are formed in material that defines one of the "spokes" in the web structure of flange fitting 206. This allows inner leak detection port 230 to pass into inner leak detection passageway 234 while remaining isolated from outer fluid conduit 204. As mentioned above, an appropriate leak detector, sensor, system, or apparatus can be coupled to leakage collection conduits 210/212 for purposes of sensing fluid leakage.

Second flange fitting 208 need not be identical to first flange fitting 206. For ease of description, FIG. 15 is a perspective face view of second flange fitting 208, shown without the fluid conduits. The back side of second flange fitting 208 is similar to that depicted in FIG. 14, and as such it will not be redundantly described here. Second flange fitting 208 includes a flange body 252 (having an outer portion and an inner portion) having a sealing face surface 254 that is configured to mate with a cooperating flange fitting (such as one having the characteristics of first flange fitting 206).

Unlike first flange fitting 206, second flange fitting 208 need not have any seal grooves formed therein. Rather, sealing face surface 254 itself serves as a cooperating surface that contacts and compresses the seals of the cooperating flange fitting. FIG. 12 and FIG. 13 illustrate this feature. In this embodiment, second flange fitting 208 includes an outer leak detection passageway 256, an outer leak detection port 258, an inner leak detection passageway 260, and an inner leak detection port 262 formed therein. Outer leak detection passageway 256 and outer leak detection port 258 are similar to their respective counterparts described above for first flange fitting 206. Likewise, inner leak detection passageway 260 and inner leak detection port 262 are similar to their respective counterparts described above for first flange fitting 206. Notably, each leak detection passageway 256/260 is preferably shaped, sized, and configured such that it aligns with its respective leak detection passageway in the cooperating flange fitting when the two flange fittings are connected together (as shown in FIG. 12 and FIG. 13). When assembled in this manner, the opposing leak detection passageways cooperate and combine to form an inner leak detection duct and an outer leak detection duct.

Referring again to FIG. 12 and FIG. 13, the leak detection ducts are sealed between the sealing face surfaces of the two flange fittings. Moreover, the four ring seals function to nominally isolate the leak detection ducts from the contents of the fluid conduits. Thus, the leak detection ducts ideally remain void of the fluid passing through the fluid conduits, absent a leak condition.

Referring back to FIG. 9, leakage collection conduits 210/212 both span the length of fluid conduits 202/204 between first flange fitting 206 and second flange fitting 208. Thus, one end of inner leakage collection conduit 210 is coupled to the inner leak detection port of first flange fitting 206, and the other end of inner leakage collection conduit 210 is coupled to the inner leak detection port of second flange fitting 208. The ends of outer leakage collection conduit 212 are similarly coupled to flange fittings 206/208. The T-shaped fittings 264 of leakage collection conduits 210/212 can be utilized as coupling points for additional conduit, hoses, pipes, or tubes, which in turn can be routed to one or more leak detectors or sensors for purposes of monitoring the contents of leakage collection conduits 210/212.

Figure 16:
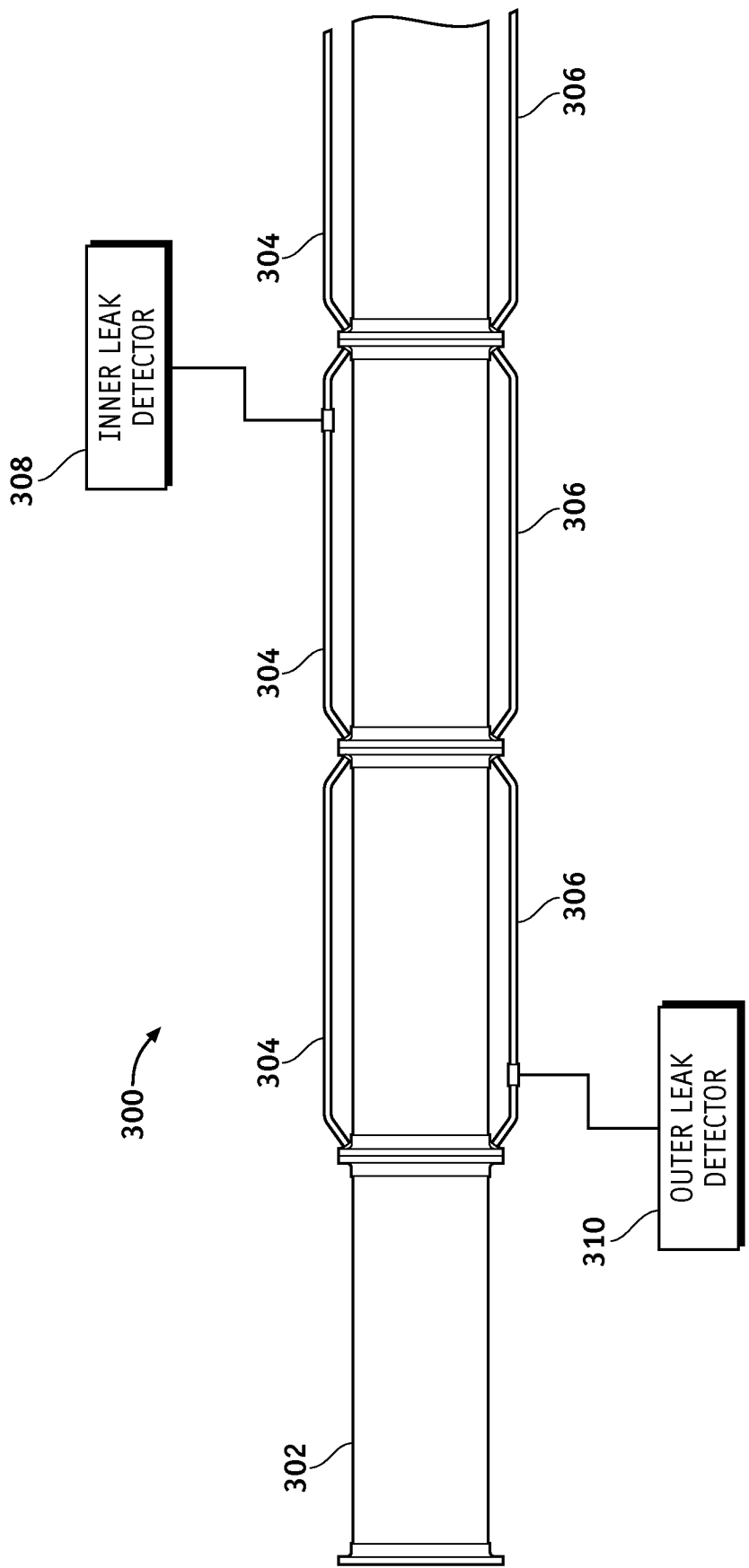
FIG. 16 is a schematic representation of an embodiment of a leak detection system.

FIG. 16 is a schematic representation of an embodiment of a leak detection system 300 for a dual walled conduit assembly 302. Each conduit section of assembly 302 may be configured as described above for conduit section 200. FIG. 16 schematically depicts a configuration where a plurality of inner leakage collection conduits 304 are coupled together in series for purposes of monitoring leakage of the inner fluid conduit of assembly 302, and where a plurality of outer leakage collection conduits 306 are coupled together in series for purposes of monitoring leakage of the outer fluid conduit of assembly 302. This embodiment of assembly 302 includes an inner leak detector 308 coupled to inner leakage collection conduits 304, and an outer leak detector 310 coupled to outer leakage collection conduits 306. Inner leak detector 308 is suitably configured to sense fluid leakage into the inner leak detection passageway(s) located in the flange fittings. Similarly, outer leak detector 310 is suitably configured to sense fluid leakage into the outer leak detection passageway(s) located in the flange fittings.

FIG. 16 depicts a simple deployment where inner leak detector 308 is fluidly coupled to only one of the inner leakage collection conduits 304, and where outer leak detector 310 is fluidly coupled to only one of the outer leakage collection conduits 306. In practice, however, a given leak detector can tap into any number of leakage collection conduits. Moreover, a single leak detector may be suitably configured to monitor inner leakage collection conduits 304 and outer leakage collection conduits 306.

A leak detector 308/310 can be selected, configured, and/or tailored to suit the needs of the particular application. For example, if the monitored fluid is a gas, then the leak detector may be realized as a pressure sensor, a chemical detector, or the like. On the other hand, if the monitored fluid is a liquid, then the leak detector may be realized as a pressure sensor, a volume meter, a flow meter, a liquid receptacle, or the like. If an undesirable amount of leakage is detected by one of the leak detectors 308/310, then corrective and/or preventative action can be taken as needed. For example, it may be desirable to shut off the flow of fluid through conduit assembly 302, sound an alarm, or the like.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of detecting a leak in a flange fitting for an inner fluid conduit and an outer fluid conduit surrounding the inner fluid conduit, comprising:

providing a flange body inner portion around an opening of the inner fluid conduit, wherein the flange body inner portion includes an inner sealing face surface configured to mate with a cooperating flange fitting;

providing a flange body outer portion around an opening of the outer fluid conduit, wherein the flange body outer portion includes an outer sealing face surface configured to mate with the cooperating flange fitting and a back surface opposite the sealing face surface;

providing a spoke structure extending between the flange body inner portion and the flange body outer portion across the opening for the outer fluid conduit formed between the flange body inner portion and the flange body outer portion;

providing an inner leak detection passageway formed in the flange body inner portion, the inner leak detection passageway terminating at the inner sealing face surface;

providing an inner leak detection port formed in the flange body inner portion, the inner leak detection port in fluid communication with the inner leak detection passageway and in fluid communication with a first outlet on the back surface of the flange body outer portion via the spoke structure;

mating the cooperating flange fitting to the inner sealing face surface and to the outer sealing face surface; and connecting a leak sensing apparatus in fluid communication with the first outlet.

2. The method of claim 1, further comprising providing a seal configured to seal the inner leak detection passageway between the inner sealing face surface and the cooperating flange fitting.

3. The method of claim 2, wherein the seal is further configured to nominally seal the inner fluid conduit from the outer fluid conduit.

4. The method of claim 2, wherein the seal comprises:
a first ring seal positioned around the opening of the inner fluid conduit and located between the inner fluid conduit and the inner leak detection passageway; and
a second ring seal positioned around the opening of the inner fluid conduit and located between the inner leak detection passageway and the outer fluid conduit.

5. The method of claim 1, further comprising:
providing an outer leak detection passageway formed in the flange body outer portion, the outer leak detection passageway terminating at the outer sealing face surface;

providing an outer leak detection port formed in the flange body outer portion, the outer leak detection port in fluid communication with the outer leak detection passageway and in fluid communication with a second outlet on the back surface of the flange body outer portion; and connecting a leak sensing apparatus in fluid communication with the second outlet.

6. The method of claim 5, further comprising providing a seal configured to seal the outer leak detection passageway between the outer sealing face surface and the cooperating flange fitting.

7. The method of claim 6, wherein the seal is further configured to nominally seal the outer leak detection passageway from the outer fluid conduit.

8. The method of claim 6, wherein the seal comprises:
a first ring seal positioned around the opening of the outer fluid conduit and located between the outer fluid conduit and the outer leak detection passageway; and
a second ring seal positioned around the opening of the outer fluid conduit and located around the first ring seal and around the outer leak detection passageway.

9. The method of claim 5, further comprising:
coupling a first leakage collection conduit to the first outlet;
coupling a first leak detector to the first leakage collection conduit, the first leak detector being configured to sense fluid leakage into the inner leak detection passageway;
coupling a second leakage collection conduit to the second outlet; and
coupling a second leak detector to the second leakage collection conduit, the second leak detector being configured to sense fluid leakage into the outer leak detection passageway.

* * * * *